United States Patent [19]

Minagawa et al.

[11] Patent Number: 5,679,452
[45] Date of Patent: Oct. 21, 1997

[54] EXPANDED CERAMIC MOLDED PLATE

[75] Inventors: Mitsuo Minagawa; Osamu Minagawa, both of Komagane, Japan

[73] Assignee: Revall Co., Ltd., Komagane, Japan

[21] Appl. No.: 613,311

[22] Filed: Mar. 11, 1996

[30] Foreign Application Priority Data

| Mar. 15, 1995 | [JP] | Japan | 7-092930 |
| Jun. 15, 1995 | [JP] | Japan | 7-182004 |
| Jul. 26, 1995 | [JP] | Japan | 7-219376 |
| Aug. 21, 1995 | [JP] | Japan | 7-245024 |

[51] Int. Cl.$^6$ .................. C04B 20/06; B32B 5/16
[52] U.S. Cl. .......... 428/313.3; 428/403; 428/688; 428/333; 428/312.2; 428/312.6; 428/313.9
[58] Field of Search ................ 428/402.24, 403, 428/688, 333, 312.2, 312.6, 313.3, 319.9; 264/43; 106/18.24, 409; 501/124

[56] References Cited

U.S. PATENT DOCUMENTS

| 4,132,560 | 1/1979 | Marquisee et al. | 106/409 |
| 4,303,732 | 12/1981 | Torobin | 428/333 |
| 4,512,806 | 4/1985 | Graham | 106/18.24 |
| 4,874,726 | 10/1989 | Kleeb et al. | 501/124 |
| 5,225,123 | 7/1993 | Torobin | 264/43 |

*Primary Examiner*—Kathleen Choi
*Attorney, Agent, or Firm*—Larson & Taylor

[57] ABSTRACT

The expanded ceramic molded plate of the present invention is produced by point joining together ceramic micro-hollow particles of a compact strength of 600 kgf/cm$^2$ or more, a bulk density of 0.3 to 0.5 g/cm$^3$, and a melting point of 1500° C. or more, at the tangent points thereof, by means of an inorganic binder, so that air flow pores in the shape of a capillary tube can be retained among the individual micro-hollow particles.

5 Claims, No Drawings

EXPANDED CERAMIC MOLDED PLATE

1. Field of the Invention

The present invention relates to an expanded ceramic molded plate for use in building and construction members such as external wall materials, flooring materials, ceiling materials, roof tiles, acoustic materials, tile materials, water-permeable paving materials and the like, and additionally for use in filters, air diffuser plates and the like.

2. Description of the Prior Art

As expanded ceramic molded plates, conventionally, use has been made widely of expanded ceramic molded plates produced by adding a perforating agent or an expanding agent to a slurry containing ceramic powder and a binder, and thereafter molding and baking the slurry.

So as to prepare a ceramic molded plate with a high porosity and a large open pore size using a perforating agent, the perforating agent should be used at a vast amount, which is dispersed in the slurry and splashed during baking, to damage the expanded ceramic molded plate. Therefore, it is difficult to stabilize the quality of such expanded ceramic molded plate.

Furthermore, it is difficult to produce a ceramic molded plate with a micro-hollow shell with regularity as designed, by using an expanding agent.

Additionally, use has been made of expanded ceramic molded plates of inorganic fine expanded substances bound with binders in a variety of fields.

For example, Japanese Patent Publication No. Hei 5-59061 proposes a process of kneading baked vermiculite with water glass or a water glass hardening agent for press molding. Because baked vermiculite is a simple expanded article with open pores, however, such vermiculite cannot be prepared into a light weight by such a simply process of hardening with water glass. Thus, air flow pores in the shape of a fine capillary tube in micron unit (for air flow) should never be prepared.

Japanese Patent Publication No. Hei 5-59061 aforementioned proposes a process of kneading spherical shirasu balloon with water glass and a water glass hardening agent for press molding. However, the compact strength of shirasu balloon is as low as 80 kgf/cm$^2$, and half of the weight and one-third of the volume are occupied with non-expanded matters. Still further, because shirasu balloon is damaged during kneading and press molding of the raw materials, a molded article of a satisfactorily light weight cannot be prepared. Because water glass is filled among the shirasu balloon and others, the expanded hollow particles cannot be joined together at their tangent points, so that it is impossible to form air flow pores in the shape of a fine capillary tube in micron unit (for air flow).

The water glass hardening agent used in the Japanese Patent Publication No. Hei 5-59061 is sodium silicofluoride regulated as a poisonous and deleterious substance. Thus, the use thereof is not preferable.

As has been described above, conventional expanded ceramic molded plates are those having fine hollows inside the ceramic molded plate or fine expanded articles having the periphery simply bound with binders and the like. Therefore, air cannot pass through such conventional expanded ceramic molded plates; on the contrary, those plates for the purpose of air diffuser plates or filters have larger dimensions of air flow pores. Thus, the former ones are heavier with poor heat insulating properties, while the latter ones have lower heat insulating properties with no resistance against fire.

BRIEF SUMMARY OF THE INVENTION

The present invention has overcome the problems of the conventional expanded ceramic molded plates. It is an objective of the present invention to provide an excellent expanded ceramic molded plate having a greater strength in spite of the light weight and additionally having good heat insulating performance with air permeability and having also the back face with extremely low elevated temperature during fire.

A second objective of the present invention is to provide an expanded ceramic molded plate with water absorption potency at such a higher degree that absorbed water is dispersed into its entirety and is then vaporized spontaneously.

DESCRIPTION OF THE PREFERRED EMBODIMENTS

In such circumstance, the expanded ceramic molded plate of the present invention has been achieved to overcome the aforementioned problems, by joining ceramic micro-hollow particles together at their tangent points to prepare air flow pores in the shape of a fine capillary tube in micron unit (for air flow) among the micro-hollow particles.

In accordance with the present invention, an infinite number of air flow pores in the shape of a fine capillary tube in micron unit (for air flow) are fabricated in an expanded ceramic molded plate. More specifically, ceramic micro-hollow particles of a compact strength of 600 kgf/cm$^2$ or more, a bulk density of 0.3 to 0.5 g/cm$^3$, and a melting point of 1500° C. or more, are joined together at their tangent points by means of an inorganic binder so that air flow pores in the shape of a fine capillary tube in micron unit (for air flow) might be secured among the individual micro-hollow particles. As has been described above, because the ceramic micro-hollow particles in the expanded ceramic molded plate are present in the shape of an absolute sphere, a vast amount of the ceramic micro-hollow particles are joined together at their tangent points. Thus, an infinite number of air flow pores in the shape of a fine capillary tube in micron unit is to be present excluding at the part of the joining points.

The ceramic micro-hollow particles have a compact strength of 600 kgf/cm$^2$ or more. Herein, the term "compact strength" is the synonym of hydraulic pressure-resistant strength, which is determined as follows; charging the ceramic micro-hollow particles in water, pressing the water, compacting the ceramic micro-hollow particles by means of the pressure onto the water, the pressure limit for such compacting is determined as the strength.

By using the ceramic micro-hollow particles of a compact strength of 600 kgf/cm$^2$ in accordance with the present invention, no damage of the micro particles occurs during the agitation and kneading process or the press molding process. Thus, the ceramic micro-hollow particles remain in the shape of an absolute sphere.

For producing the expanded ceramic molded plate capable of exhibiting excellent performance, the agitation and kneading process should be satisfactorily carried out, which is particularly important for producing a uniform expanded ceramic molded plate product of good quality. During sufficient agitation and kneading of the composition of the present invention, it is believed that the stress and shear strength loaded upon the ceramic micro-hollow particles are around about 400 kgf/cm$^2$. When the compact strength of the ceramic micro-hollow particles is low, most of the ceramic micro-hollow particles may be damaged during the kneading process of the raw materials. Thus, the designed objectives cannot be attained perfectly. Conventional inorganic fiber hollow expanded articles include shirasu balloon, glass balloon, silica balloon and the like, and their compact strengths are as follows; shirasu balloon has a compact strength as low as 80 kgf/cm², while glass balloon and silica balloon have compact strengths of about 150 to 200 kgf/cm². Thus, the objectives of the present invention cannot be attained.

The melting point of the ceramic micro-hollow particles to be used in accordance with the present invention is 1500° C. or more. Generally, a ceramic micro-hollow particle of a material having a higher melting point has a greater compact strength. For a compact strength of 600 kgf/cm², the melting point should be 1500° C. or more.

The bulk density of the ceramic micro-hollow particles to be used in accordance with the present invention is 0.3 to 0.5 g/cm³. Because the ceramic micro-hollow particles of the present invention are of an absolute sphere, the particles are of such an extremely light weight. Because the ceramic micro-hollow particles of the present invention are of an absolute sphere, their thermal conductivity is around 0.1 kcal/m.hr.°C.. The thermal conductivity will be lowered down to 0.2 kcal/m.hr.°C. when half of the micro-hollow particles are damaged.

The components of the ceramic micro-hollow particles are aluminosilicate-based ceramic particles, composed of 50 to 60% by weight of silica components and 37 to 47% by weight of alumina components, wherein other components should be present at 3% by weight or less, preferably 1.5% by weight or less. Ceramic micro-hollow particles are produced by heating and expanding ceramic particles. Because the particles contain such a less content of other components, the particles have a compact strength of 700 kgf/cm² or more, a melting point of 1600° C. or more, a bulk density of 0.3 to 0.5 g/cm³, and a thermal conductivity of 0.1 kcal/m.hr.°C.

By designating the fine grain 12 to 75 µm, the medium grain 75 to 150 µm and the coarse grain 150 to 350 µm, the grains of the particles are adjusted of their sizes. Then, the resulting particles are mixed together for use. Because the ceramic micro-hollow particles of the fine grain are heavy while the particles of the coarse grain are light, the bulk density should be within a range of 0.3 to 0.5 g/cm³.

In the expanded ceramic molded plate of the present invention, the ceramic micro-hollow particles are joined together by means of an inorganic binder, including the following various ones.

Firstly, the inorganic binder includes, for example, alkaline metal silicate salt.

Alkaline metal silicate salt can form an outstanding, strong glassy film, which is represented by the general formula $M_2O.mSiO_2.nH_2O$ wherein the alkali metal species "M" is sodium, potassium, lithium and the like, and additionally, a quaternary-ammonium salt as the specific type. As the hardening agent to prepare the alkali metal silicate salt into a strong glassy hardened matter, use may be made of phosphate salt glass powder and Portland cement.

Phosphate salt glass powder is excellent in terms of water resistance and efflorescence resistance, which have been the drawbacks of conventional hardening agents. Additionally, the powder can optionally adjust the hardening time. Therefore, the surface of the phosphate salt glass powder is treated so as to form thereon an insoluble or slightly-soluble reaction layer capable of appropriately adjusting the hardening time, so that the phosphate salt glass powder is composed of three or more components.

Also, Portland cement can harden the alkaline metal silicate salt for a short period, and due to the hardening of the hydration of Portland cement, the cement can produce the hardened matter in a stable manner for a long term. Thus, the matter can be handled readily after molding.

The inorganic binder includes for example a ceramic composition containing a flux.

The "flux" herein means one or two or more of feldspar, lime stone, magnesium carbonate, lime phosphate, lead oxide, boric acid, borax, sodium carbonate, sodium nitrate, and zinc oxide. The ceramic composition includes for example an acid oxide such as $B_2O_3$, $SiO_2$, $GeO_2$, $ZrO_2$, $P_2O_5$, $As_2O_5$, $Sb_2O_3m$, $Bi_2O_3$, $P_2O_3$, $Sb_2O_5$, and $SO_3$, with addition of a basic oxide such as $Na_2O$, $K_2O$, $CaO$, and $MgO$ or with addition of $Al_2O_3$, $Fe_2O_3$, $ZnO$, $PbO$, and $TiO_2$. As such ceramic composition, use may be made of for example, one or two or more of $SiO_2$—$Na_2O$—$B_2O_3$, $SiO_2$—$Na_2O$—$CaO$, $SiO_2$—$K_2O$—$CaO$, $Al_2O_3$—$SiO_2$—$Na_2O$—$CaO$—$B_2O_3$, $Al_2O_3$—$SiO_2$—$TiO_2$—$CaO$—$B_2O_3$, $CaO$—$SiO_2$—$Al_2O_3$—$Fe_2O_3$, and $SiO_2$—$Al_2O_3$—$K_2O$. As natural ones, otherwise, use may be made of kaolin, plastic clay (blister clay, wood-node clay, ball clay, etc.), sericite, pottery stone, agalmatolite, bentonire, silica rock, chamotte, magnesite, dolomite, wollastonite, talc, bone ash and the like, and a mixture of two or more thereof.

As the inorganic binder, also, use may be made of a part of the ceramic micro-hollow particles. In such case, the outer surface of the ceramic micro-hollow particles may function as such inorganic binder when the ceramic micro-hollow particles are heated at a temperature to soften the outer surface below the melting point of the particles. The temperature is preferably 1100° to 1400° C. By heating the particles at the temperature, the individual ceramic micro-hollow particles are joined together completely without damage on the surface. The expanding temperature of the ceramic micro-hollow particles is 1200° to 1500° C.; if the joining temperature is above the expanding temperature, the surface of the ceramic micro-hollow particles may be damaged. Thus, the joining temperature should be below the expanding temperature.

In the expanded ceramic molded plate of the present invention, the ratio of blending an inorganic binder to the ceramic micro-hollow particles is 10 to 300 parts, preferably 40 to 200 parts by weight of the inorganic binder to 100 parts by weight of the ceramic micro-hollow particles. If the inorganic binder is below 10 parts by weight, satisfactory joining cannot be attained, with the result of no increase of the sealing strength of the ceramic micro-hollow particles. If the inorganic binder is above 300 parts by weight, the melt matters in the expanded ceramic molded plate are too much to form air flow pores in the shape of a fine capillary tube.

The process of producing the expanded ceramic molded plate of the present invention will now be described hereinbelow.

Firstly, the ceramic micro-hollow particles are kneaded with an inorganic binder.

When the inorganic binder is an alkaline metal silicate salt, the salt is preferably used in the form of an aqueous solution; kneading is effected of a composition of 40 to 200 parts by weight of an aqueous solution of an alkaline metal silicate salt, 50 to 300 parts by weight of Portland cement, and 20 to 150 parts by weight of water to 100 parts by weight of the ceramic micro-hollow particles.

When using surface-treated phosphate salt glass powder of three or more components instead of Portland cement, kneading is effected of a composition of 100 parts by weight of the ceramic micro-hollow particles, 40 to 200 parts by weight of an aqueous solution of an alkaline metal silicate salt, and 16 to 90 parts by weight of phosphate salt glass powder. A hydraulic binder and water may be added.

When the inorganic binder is a ceramic composition containing a flux, kneading is effected of a composition composed of 10 to 300 parts by weight of the ceramic composition containing a flux material to 100 parts by weight of the ceramic micro-hollow particles. A hydraulic binder and water may be added.

When a part of the ceramic micro-hollow particles is used as the inorganic binder, the ceramic micro-hollow particles are adjusted of their grain size, to maintain a very dense form only by press molding. Therefore, in principle, no binder is needed to maintain the form before heating and joining. However, a hydraulic binder and water may be added, when it is difficult to maintain the form before heating and joining because of the form of the mold.

So as to improve the properties of the composition and the performance of the molded article, if necessary, addition may be made of a dispersant, a thickening agent, an antibacterial agent and an antifungal agent, other blending agents and an inorganic pigment and the like.

Subsequently, charging and press molding each of the kneaded products in a mold prior to heating and fusing, the expanded ceramic molded plate can be produced. When the inorganic binder is an alkaline metal silicate salt and the hardening agent is phosphate salt glass powder, such product is pressure molded and left to curing for about 40 to 60 minutes without heating. As the molding process, the kneaded products may be fed onto a conveyor prior to roller pressing for continuous molding.

The pressure during the molding varies, depending on the particle diameter of the ceramic micro-hollow particles to be used, but the pressure is preferably 50 to 500 kgf/cm$^2$, more preferably 50 to 300 kgf/cm$^2$. By such pressing process, the expanded ceramic molded plate gets more dense with a higher strength.

The heating temperature is preferably 700° to 1400° C. When the inorganic binder is an alkaline metal silicate salt and the hardening agent is Portland cement, preferably, curing will be effected for one to 10 hours, prior to heating at a lower temperature of 300° to 700° C.

In order to color the expanded ceramic molded plate, various means may be applicable, for example, preliminary coloring of the ceramic micro-hollow particles. A inorganic coloring pigment can be coated readily onto the ceramic micro-hollow particles, by spraying the inorganic coloring pigment in slurry over the ceramic micro-hollow particles, or by charging and mixing together the ceramic micro-hollow particles, the inorganic coloring pigment and water in a rolling-type mixer under stirring.

The inorganic coloring pigment is in preparation of a fine powder of 44 μm or less, and as such, use may be made of cobalt pigment, iron pigment, chromium pigment, manganese pigment, copper pigment, vanadium pigment, mercury pigment, lead pigment, sulfide pigment and the like.

In the expanded ceramic molded plate of the present invention are used ceramic micro-hollow particles of a higher strength, so that the plate is of a light weight with a higher strength. Because the ceramic micro-hollow particles in the expanded ceramic molded plate of the present invention is present in the shape of an absolutely spherical hollow substance, furthermore, the ceramic micro-hollow particles are joined together by means of point joint, and excluding at the parts of such point joints, an infinite number of air flow pores in the shape of a fine capillary tube in micron unit are present.

Because an infinite number of the air flow pores in the shape of a fine capillary tube in the expanded ceramic molded plate in accordance with the present invention are spread in the form of a network structure, air can flow and dispersed entirely from the surface of the expanded ceramic molded plate even at an air pressure as low as only 1 kgf/cm$^2$, so that air flows not only out of the back face but also out of the periphery.

The expanded ceramic molded plate of the present invention has such good heat insulating performance that the temperature elevation of the back face is extremely low against fire. Additionally, the plate has very high water absorption potency; when water is dropped onto the plate, water is instantly absorbed into the plate and dispersed entirely for spontaneous evaporation, without oozing outward, until water absorption reaches saturation. Furthermore, even if the absorbed water is frozen, the expansion pressure is dispersed uniformly peripherally, without any crack occurrence due to the freezing.

The expanded ceramic molded plate of the present invention is preferable for use in filters, evaporation plates, air diffuser plates and the like; and the plate is preferable for use in building materials in the field requiring moisture adjustment, in particular.

The present invention will now be described in examples, but the invention is not limited to these examples.

EXAMPLE 1

As the ceramic micro-hollow particles, use was made of a baked product, composed of 39% of an alumina component and 59% of a silica component (1.5% by weight of other components). The properties are as follows; compact strength of 700 kgf/cm$^2$, bulk density of 0.3 to 0.5 g/cm$^3$, melting point of 1600° C., and heat conductivity of 0.1 kcal/m.hr.°C. The particles are composed of absolutely hollow particles alone. The grains of the ceramic micro-hollow particles were adjusted, such as 6 parts by weight of the fine grain, 59 parts by weight of the medium grain and 35 parts by weight of the coarse grain.

As the binder, use was made of an aqueous solution of an alkaline metal silicate salt; as the hardening agent, Portland cement was used. The aqueous solution of the alkaline metal silicate salt was an aqueous solution of sodium silicate composed of 9.4% by weight of Na$_2$O and 29.4% by weight of SiO$_2$.

As the hydraulic binder, polyethylene glycol was used.

As the blending agent, use was made of a dispersant, a thickening agent, a stabilizer and the like.

Blending agent of 1.2 parts by weight the were added to 100 parts by weight of the ceramic micro-hollow particles, 80 parts by weight of the aqueous solution of the alkaline metal silicate salt, 150 parts by weight of Portland cement, and 75 parts by weight of water prior to sufficient kneading.

The resulting kneaded product was charged into a mold to form a plate, which was then press molded at a pressure of 300 kgf/cm$^2$. Subsequently, the molded article was cured at room temperature for 2 hours, prior to heating and fusing at 540° C. for 30 minutes to prepare an expanded ceramic molded plate.

The dimension of the resulting expanded ceramic molded plate is as follows; a length of 500 mm, a width of 500 mm and a thickness of 30 mm.

The following properties of the resulting expanded ceramic molded plate were determined.

1. Density

Measuring the weight and volume of the resulting expanded ceramic molded plate, the density was determined.

Owing to no occurrence of the damage of the ceramic micro-hollow particles, the particles were very light with a final density of 0.63 g/cm$^3$.

2. Compact strength

The hydraulic-resistant strength was measured.

The compact strength was as excellent as 134 kgf/cm$^2$.

3. Air permeability

From one face toward the other face of the expanded ceramic molded plate, air was splashed so as to test whether or not air permeated through the plate from the one face to the other face.

The result indicates air permeability.

4. Water absorption ratio

Immersing the expanded ceramic molded plate in water, the ratio of the weight of the absorbed water to the weight of the expanded ceramic molded plate was determined.

The resulting water absorption ratio was 107%.

5. Water permeability

Water was arranged on the upper face of the expanded ceramic molded plate to test whether or not water permeated through the bottom face. When water permeated, the water absorption ratio then was determined.

The result indicates that water permeated at a water absorption ratio of 105%.

6. Heat permeability

Positioning the flame top of a gas burner toward the bottom face of the expanded ceramic molded plate, the temperature of the upper face was measured. The temperature of the top of the gas burner was about 1200° C. for a flame irradiation period of 10 minutes.

The air elevated by the flame mostly flew along the expanded ceramic molded plate.

The elevated temperature of the back face was as very low as 88° C.

Comparative Example 1

An expanded ceramic molded plate was prepared as in Example 1, except that shirasu balloon was used instead of the ceramic micro-hollow particles. The weight and volume of the shirasu balloon were originally occupied by the absolutely hollow expanded matters at ratios of one-third and one half, respectively. Additionally, because most of the shirasu balloon was damaged through press molding, the expanded ceramic molded plate was very heavy with a final density of 1.44 g/cm$^3$.

The compact strength was 82 kgf/cm$^2$; due to the damage of the shirasu balloon, the binding via the hardening component was not perfect. Therefore, the ceramic molded plate could not acquire a satisfactory strength.

Air could not permeate at the air permeability test. This is due to the fact that no air flow pores in the shape of a fine capillary tube in micron unit could be generated inside the molded plate, because of the damage of the shirasu balloon.

The water absorption ratio was 36%; no water permeated at the water permeability test. This also indicates that no air flow pores were generated in the molded plate.

The temperature of the back face was 301° C. at the heat permeability test.

Comparative Example 2

An expanded ceramic molded plate was prepared as in Example 1, except that glass balloon was used instead of the ceramic micro-hollow particles. Nearly 60% of the glass balloon was damaged through press molding, so that the expanded ceramic molded plate was at a density of 1.18 g/cm$^3$, considerably heavier than the plate of Example 1.

The compact strength was 81 kgf/cm$^2$, which indicates that due to the damage of the glass balloon, the binding via the hardening component was not perfect. Thus, the ceramic molded plate could not acquire a satisfactory strength.

Air could not permeate at the air permeability test. This is due to the fact that no fine air flow pores in the shape of a fine capillary tube in micron unit could be generated inside the molded plate, because of the damage of the glass balloon.

The water absorption ratio was 45%; no water permeated at the water permeability test. This also indicates that no air flow pores were generated in the molded plate.

The temperature of the back face was 283° C. at the heat permeability test.

EXAMPLE 2

As the ceramic micro-hollow particles, use was made of a baked product composed of 39% of an alumina component, and 59% of a silica component (1.5% by weight of other components). The properties are as follows; compact strength of 700 kgf/cm$^2$, bulk density of 0.3 to 0.5 g/cm$^3$, melting point of 1600° C., and heat conductivity of 0.1 kcal/m.hr.°C. The particles are composed of absolutely hollow particles alone. The grains of the ceramic micro-hollow particles were adjusted to such a ratio as 10 parts by weight of the fine grain, 20 parts by weight of the medium grain and 30 parts by weight of the coarse grain.

As the binder, use was made of an aqueous solution of an alkaline metal silicate salt and phosphate salt glass powder (hardening agent) of three or more components, with the surface treated to form an insoluble or slightly-soluble reaction layer thereon.

As aqueous solution of the alkaline metal silicate salt, use was made of an aqueous solution of sodium silicate, composed of 9.4% by weight of Na$_2$O and 29.4% by weight of SiO$_2$. The phosphate salt glass powder of three or more components was produced from metal oxides such as phosphorus pentoxide (P$_2$O$_5$), alumina (Al$_2$O$_3$), zinc oxide (ZnO), calcium oxide (CaO) and the like.

The glass powder with the surface treated to form an insoluble or slightly-soluble layer through the reaction with this glass powder, was used.

As the hydraulic binder, polyethylene glycol was used.

As the blending agent, use was made of a dispersant, a thickening agent, a stabilizer and the like.

Blending agent of 1.2 parts by weight the were added to 100 parts by weight of the ceramic micro-hollow particles, 80 parts by weight of the aqueous solution of the alkaline metal silicate salt, 32 parts by weight of the phosphate salt glass powder of three or more components prior to agitation, followed by addition of 2 parts by weight of the hydraulic binder and 10 parts by weight of water for sufficient kneading.

The resulting kneaded product was charged into a mold to form a plate, which was then press molded at a pressure of 300 kgf/cm$^2$. After press molding, subsequently, the molded article was cured at room temperature for 60 minutes, to prepare an expanded ceramic molded plate. The dimension of the resulting expanded ceramic molded plate is as follows; a length of 500 mm, a width of 500 mm and a thickness of 30 mm.

The expanded ceramic molded plate was very light with a density of 0.57 g/cm$^3$, owing to no damage on the ceramic micro-hollow particles.

The compact strength was as excellent as 116 kgf/cm².

It is indicated that air can permeate through the plate at the air permeability test.

The water absorption ratio was 120%; at a water permeation test, it is indicated that water oozed out through the back face at the water absorption ratio of 117%.

The temperature of the back face was as low as 85° C. at the heat permeability test.

Comparative Example 3

An expanded ceramic molded plate was prepared as in Example 2, except that shirasu balloon was used instead of the ceramic micro-hollow particles. The weight and volume of the shirasu balloon were originally occupied by absolutely hollow matters at ratios of one third and one half, respectively. Additionally, most of the shirasu balloon was damaged during press molding, so that the expanded ceramic molded plate was very heavy, at a density of 1.38 g/cm³.

The compact strength was V6 kgf/cm², which indicates that due to the damage of the shirasu balloon, the binding via the ceramic composition containing a flux material was not perfect. Thus, the ceramic molded plate could not acquire a satisfactory strength.

Air could not permeate at the air permeability test. This is due to the fact that no air flow pores in the shape of a fine capillary tube in micron unit could be generated inside the molded plate due to the damage of the shirasu balloon.

The water absorption ratio was 39%; no water permeated at the water permeability test. This also indicates that no air flow pores were generated in the molded plate.

The temperature of the back face was 283° C. at the heat permeability test.

Comparative Example 4

An expanded ceramic molded plate was prepared as in Example 2, except that glass balloon was used instead of the ceramic micro-hollow particles. Nearly 60% of the glass balloon was degraded during press molding, so that the expanded ceramic molded plate was of a density of 1.16 g/cm³, considerably heavier than the product of Example 2.

The compact strength was 91 kgf/cm², which indicates that due to the damage of the glass balloon, the binding via the ceramic composition containing a flux material was not perfect. Thus, the ceramic molded plate could not acquire a satisfactory strength.

Air could not permeate at the air permeability test. This is due to the fact that no fine air flow pores in the shape of a fine capillary tube could be generated inside the molded plate, because of the damage of the glass balloon.

The water absorption ratio was 47%; no water permeated at the water permeability test. This also indicates that no air flow pores were generated in the molded plate.

The temperature of the back face was 264° C. at the heat permeability test.

EXAMPLE 3

As the ceramic micro-hollow particles, use was made of a baked product composed of 39% of an alumina component, and 59% of a silica component (1.5% by weight of other components). The properties are as follows; compact strength of 700 kgf/cm², bulk density of 0.3 to 0.5 g/cm³, melting point of 1600° C., and heat conductivity of 0.1 kcal/m.hr.°C. The particles are composed of absolutely hollow particles alone. The grains of the ceramic micro-hollow particles were adjusted to such a ratio as 10 parts by weight of the fine grain, 20 parts by weight of the medium grain and 30 parts by weight of the coarse grain.

As the binder, use was made of a ceramic composition containing a flux material. As such ceramic composition, use was made of a product produced by adding 10 parts by weight of borax and 10 parts by weight of feldspar both as fluxes to 100 parts by weight of a mixture of almost equivalent amounts of glass powder of $SiO_2$—$Na_2O$—$CaO$, kaolin and ball clay.

As the hydraulic binder, polyethylene glycol was used.

As the blending agent, use was made of a dispersant, a thickening agent, a stabilizer and the like.

Blending agent of 1.2 parts by weight the were added to 100 parts by weight of the ceramic micro-hollow particles, and 30 parts by weight of the binder under agitation, followed by addition of 2 parts by weight of the hydraulic binder and 40 parts by weight of water prior to sufficient kneading.

The resulting kneaded product was charged into a mold to form a plate, which was then press molded at a pressure of 300 kgf/cm². Subsequently, the molded article was cured at room temperature for 60 minutes, prior to heating and fusing at 1100° C. for 45 minutes, to prepare an expanded ceramic molded plate.

The dimension of the resulting expanded ceramic molded plate is as follows; a length of 600 mm, a width of 400 mm and a thickness of 30 mm.

The expanded ceramic molded plate was very light with a density of 0.60 g/cm³ owing to no damage on the ceramic micro-hollow particles.

The compact strength was as excellent as 120 kgf/cm².

It is indicated that air can permeate through the plate at the air permeability test.

The water absorption ratio was 130%; at a water permeation test, it is indicated that water oozed out through the back face at a water absorption ratio of 115%.

The temperature of the back face was as very low as 75° C. at the heat permeability test.

Comparative Example 5

An expanded ceramic molded plate was prepared as in Example 3, except that shirasu balloon was used instead of the ceramic micro-hollow particles. The weight and volume of the shirasu balloon were originally occupied by absolutely hollow matters at ratios of one third and one half, respectively. Additionally, most of the shirasu balloon was damaged during press molding, so that the expanded ceramic molded plate was very heavy, at a density of 1.78 g/cm³.

The compact strength was 51 kgf/cm², which indicates that due to the damage of the shirasu balloon, the binding via the ceramic composition containing a flux material was not perfect. Thus, the ceramic molded plate could not acquire a satisfactory strength.

Air could not permeate at the air permeability test. This is due to the fact that no air flow pores in the shape of a fine capillary tube in micron unit could be generated inside the molded plate due to the damage of the shirasu balloon.

The water absorption ratio was 13%; no water permeated at the water permeability test. This also indicates that no air flow pores were generated in the molded plate.

The temperature of the back face was 330° C. at the heat permeability test.

Comparative Example 6

An expanded ceramic molded plate was prepared as in Example 3, except that glass balloon was used instead of the ceramic micro-hollow particles. Nearly 60% of the glass balloon was damaged during press molding, so that the expanded ceramic molded plate was of a density of 1.25 g/cm$^3$, which was considerably heavier than the product of Example 3.

The compact strength was 68 kgf/cm$^2$, which indicates that due to the damage of the glass balloon, the binding via the ceramic composition containing a flux material was not perfect. Thus, the ceramic molded plate could not acquire a satisfactory strength.

Air could not permeate at the air permeability test. This is due to the fact that no air flow pores in the shape of a fine capillary tube in micron unit could be generated inside the molded plate, due to the damage of the glass balloon.

The water absorption ratio was 18%; no water permeated at the water permeability test. This also indicates that no air flow pores were generated in the molded plate.

The temperature of the back face was 280° C. at the heat permeability test.

EXAMPLE 4

As the ceramic micro-hollow particles, use was made of a baked product composed of 39% of an alumina component, and 59% of a silica component (1.5% by weight of other components). The properties are as follows; compact strength of 700 kgf/cm$^2$, bulk density of 0.3 to 0.5 g/cm$^3$, melting point of 1600° C., and heat conductivity of 0.1 kcal/m.hr.°C. The particles are composed of absolutely hollow particles alone. The grains of the ceramic micro-hollow particles were adjusted to such a ratio as 10 parts by weight of the fine grain, 20 parts by weight of the medium grain and 30 parts by weight of the coarse grain.

The ceramic micro-hollow particles were charged into a mold and press molded at a pressure of 200 kgf/cm$^2$. Removing the mold subsequently, heating and joining process was carried out under the following conditions; at a rate of temperature elevation or lowering at 60° C./min, the molded article was retained at the maximum temperature of 1300° C. for one minute.

The dimension of the resulting expanded ceramic molded plate was of a length of 600 mm, a width of 400 mm and a thickness of 30 mm.

The expanded ceramic molded plate was very light with a density of 0.45 g/cm$^3$, owing to no damage on the ceramic micro-hollow particles.

The compact strength was as excellent as 136 kgf/cm$^2$.

It is indicated that the plate can permeate air at the air permeability test.

The water absorption ratio was 128%; at a water permeation test, it is indicated that water permeated through the back face at a water absorption ratio of 108%.

The temperature of the back face was as low as 68° C. at the heat permeability test.

Comparative Example 7

An expanded ceramic molded plate was prepared as in Example 4, except that shirasu balloon was used instead of the ceramic micro-hollow particles, and that use was made of polyethylene glycol as the molding binder at the maximum temperature of heating and fusing of 800° C. The weight and volume of the shirasu balloon were originally occupied by absolutely hollow matters at ratios of one third and one half, respectively. Additionally, most of the shirasu balloon was damaged during press molding, so that the expanded ceramic molded plate was very heavy, with a density of 1.68 g/cm$^3$.

The compact strength was 46 kgf/cm$^2$, which indicates the damage of the shirasu balloon and that the micro-hollow particles could not be point joined together perfectly.

Air could not permeate at the air permeability test. This is due to the fact that no air flow pores in the shape of a fine capillary tube could be generated inside the molded plate due to the damage of the shirasu balloon.

The water absorption ratio was 18%; no water permeated at the water permeability test. This also indicates that no air flow pores were generated in the molded plate.

The temperature of the back face was 350° C. at the heat permeability test.

Comparative Example 8

An expanded ceramic molded plate was prepared as in Example 4, except that glass balloon was used instead of the ceramic micro-hollow particles, and that use was made of polyethylene glycol as a molding binder at the maximum heating and fusing temperature of 900° C. Nearly 60% of the glass balloon was damaged during press molding, so that the expanded ceramic molded plate was of a density of 1.21 g/cm$^3$, which was considerably heavier than the product of Example 4.

The compact strength was 56 kgf/cm$^2$, which indicates the damage of the glass balloon and that the micro-hollow particles could not be point joined together perfectly.

Air could not permeate at the air permeability test. This is due to the fact that no air flow pores in the shape of a fine capillary tube in micron unit could be generated inside the molded plate due to the damage of the glass balloon.

The water absorption ratio was 21%; no water permeated at the water permeability test. This also indicates that no air flow pores were generated in the molded plate.

The temperature of the back face was 310° C. at the heat permeability test.

What is claimed is:

1. An expanded ceramic molded plate produced by point joining together aluminosilicate micro-hollow particles comprised of 37% to 47% by weight of alumina components and 50% to 60% by weight of silica components having a compact strength of 600 kgf/cm$^2$ or more, a bulk density of 0.3 to 0.5 g/cm$^3$, and a melting point of 1500° C. or more, at the tangent points thereof by means of an inorganic binder so that air flow pores in the shape of a fine capillary tube are retained among the individual micro-hollow particles.

2. An expanded ceramic molded plate according to claim 1, wherein the inorganic binder is an alkaline metal silicate salt.

3. An expanded ceramic molded plate according to claim 1, wherein the inorganic binder is a ceramic composition containing a flux.

4. An expanded ceramic molded plate according to claim 1, wherein the inorganic binder is a part of the ceramic micro-hollow particles of a melting point of 1500° C. or more.

5. An expanded ceramic molded plate according to claim 1, wherein the ceramic micro-hollow particles are coated with an inorganic coloring pigment.

* * * * *